United States Patent [19]

Picknick et al.

[11] 4,034,668

[45] July 12, 1977

[54] SYSTEM FOR MARKING CARCASSES

[75] Inventors: John Robert Picknick; Bernard Joseph Gach, both of St. Joseph, Mo.

[73] Assignee: Armour and Company, Phoenix, Ariz.

[21] Appl. No.: 635,226

[22] Filed: Nov. 25, 1975

[51] Int. Cl.² .................................... B41F 17/00
[52] U.S. Cl. ........................... 101/35; 17/1 R
[58] Field of Search ............... 17/1 R, 14, 24, 44, 17/45; 426/87, 383, 302; 119/45 A; 101/35, 5, 37, 375; 128/316; 40/300

[56] References Cited

U.S. PATENT DOCUMENTS

| 2,083,765 | 6/1937 | Williams | 426/87 |
| 2,195,135 | 3/1940 | Serai | 101/35 |
| 2,691,936 | 10/1954 | Farkas et al. | 101/35 |
| 2,748,421 | 6/1956 | Hedstrom | 17/1 R |
| 3,327,624 | 6/1967 | Beaver | 101/35 |
| 3,851,075 | 11/1974 | Wisdom | 426/383 |

FOREIGN PATENT DOCUMENTS

| 671,342 | 3/1952 | United Kingdom | 119/45 A |

*Primary Examiner*—Hugh R. Chamblee
*Attorney, Agent, or Firm*—Frank T. Barber; Carl C. Batz

[57] ABSTRACT

A system for marking carcasses in which animal carcasses are supported on and moved along a conveyor rail, and which includes a device for marking the carcasses as they move along the rail, the device including a marking wheel which is rotatable about a substantially vertical axis, and means for resiliently urging the marking wheel toward the carcasses as they pass along the rail.

4 Claims, 4 Drawing Figures

SYSTEM FOR MARKING CARCASSES

This invention relates to a system for marking animal carcasses and more particularly to such a system in which animal carcasses are suspended by trolleys on an overhead rail in which the carcasses are marked as they pass along the rail.

BACKGROUND

In meat packing house operation it is quite common to convey animal carcasses or parts thereof on overhead rails from one part of the plant to another, and in some instances the carcasses are moved on the rail from one statiion at which certain operations are performed to other stations at which other operations are performed, inspections made, etc., until the carcasses are moved, still on the rail, into the cooler or storage, completely dressed. In this description and claims I use the term "carcass" to mean a full carcass or any part thereof including halves or quarters of carcasses and also cuts such as hams, bellies, etc.

When it is necessary to mark the carcasses as having passed inspection or as to grade or quality of meat, it has been customary to use hand operated stamping devices and an operator moves the hand operated stamping device to each carcass as it passes along on the rail conveyor. What is needed is a stamping device which would automatically stamp the carcass as it passes, however, the carcasses each are free to swing from side to side of the rail and also back and forth along the direction of the rail, and this appears to have prevented prior automatic devices from coming into use in connection with the rail conveyor. Therefore, I have set myself to the task of providing marking apparatus which will work effectively in combination with the rail conveyor system. I further have attempted to provide such a device which will be simple of construction and which can easily be cleaned as is required in packing house operation.

DESCRIPTION

One embodiment of my improved marking system has been illustrated in the accompanying drawings in which —

Figure 4:
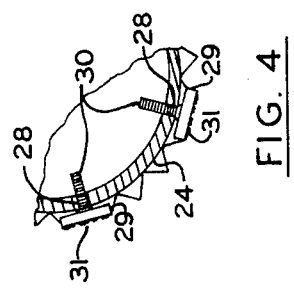
FIG. 4 is a detailed view in cross section showing the attachment of the indicia holders to the marking wheel.
Figure 1:
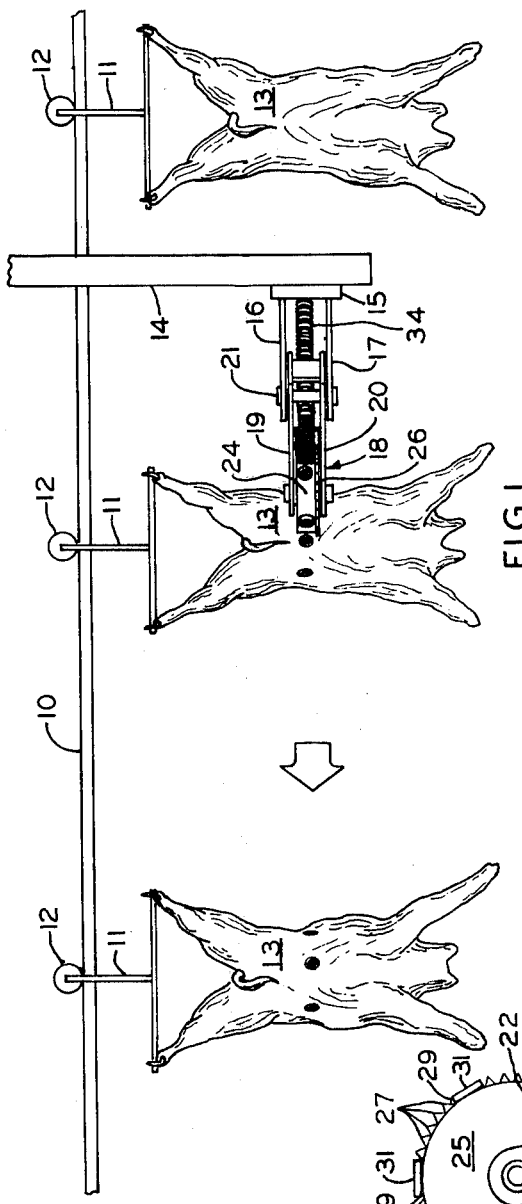
FIG. 1 is a side elevational view showing the conveyor rail and trolley means for supporting and moving the carcasses on the rail.

As illustrated, particularly in FIG. 1, a conveyor rail 10 is suitably suspended from the ceiling of a packing plant, and each of the trolley means 11 has roller 12 which rides on the rail and is adapted to support a carcass 13. The trolley means may also include a hook or other means for connecting with a moving trolley chain by which the carcass is passed horizontally in the direction of the rail. The carcasses are supported on the rail consecutively one after another, usually in spaced formation. The carcasses are moving toward the left as shown in FIG. 1.

Still referring to FIG. 1, there is shown a frame or framework 14 which may be a part of the ceiling structure of the room in which the rail is located. A bracket 15 is mounted on frame 14 at a position which is on one side of (in front or back of) the rail. As illustrated, the bracket is located in front of the rail. Bracket 15 has the spaced top and bottom strap members 16 and 17 extending laterally from the frame member 14.

An arm 18 which includes spaced top and bottom strap members 19 and 20, is pivotally attached at its one end with the extended ends of bracket members 16 and 17. The arm members 19 and 20 extend within the bracket members 16 and 17 and are pivotally connected to them by the pin 21.

A marking wheel 22 is mounted for rotation about a substantially vertical axis and is held between the extended ends of members 19 and 20 by the axle pin 23.

Wheel 22 is generally cylindrical in form and has the cylindrical surface 24 and the two sides 25 and 26. One of the sides 25 and 26 has its edge extended and serrated to form the teeth 27. The teeth 27 extend beyond the surface 24 and form an annular serrated edge.

The surface 24 is provided with spaced tapped holes 28. The holders 29 carry the stamps 31 bearing the mark of the packing plant or other indicia which is to be used in marking the carcasses, and each of these holders has a bolt 30 which can be turned into one of the tapped holes to bring the stamp down against the surface 24.

An inking roller 32 is mounted on arm 18 and makes contact with the marking wheel. Roller 32 rotates with the marking wheel and supplies ink to the stamps 31. Ink is supplied to roller 32 through tube 33.

A spring 34 has its one end attached to the bracket 15 on frame 14 and its other end pivotally connected with arm 18 at an intermediate point. The purpose of this spring is to urge the arm 18 about its pivot 21 so as to urge the marking wheel toward the carcasses as they pass along the rail. The point at which spring 34 is connected to arm 18 is sufficiently removed from the pivot point 21 that the correct amount of force is applied to the marking wheel to give it the desired pressure against the carcasses.

In operation, the carcasses to be marked are hung on the rail in consecutive spaced relation. The carcasses hang downwardly and are supported from the trolley means. They pass from right to left as shown in FIG. 1. The carcasses are, of course, free to swing from side to side and forward and back and as they pass by on the rail there is more or less swinging movement in all directions.

Figure 3:
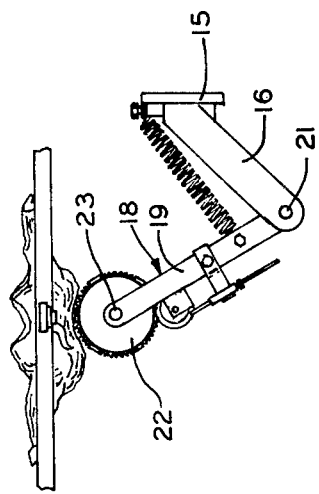
FIG. 3 is a view like FIG. 2 but showing the marking apparatus in contact with a carcass passing by on a conveyor rail.
Figure 2:
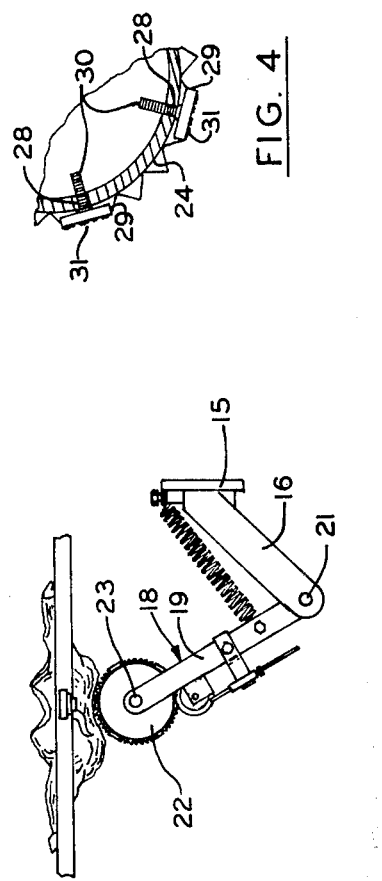
FIG. 2 is a top view of the marking apparatus.

The marking wheel is disposed in the path of the carcasses, and as this wheel is contacted by a carcass the wheel begins to turn and to roll over the surface of the carcass. Pressure from the carcass tends to move the marking wheel back as illustrated in FIG. 3, and the marking wheel rides easily over the irregular carcass surface. The spring 34 yields to allow the high points to pass as the arm 18 moves back and then urges the arm to move the marking wheel toward the carcass to conform with depressions in the carcass surface.

The inking roll supplies ink to the stamps on the marking wheel as it rotates, and also the marking wheel brings the stamps into contact with the surface of the carcass. As illustrated by the center carcass in FIG. 1, the stamps leave their marks on the carcass as the marking wheel proceeds across the carcass. These marks may indicate the establishment number of the packing plant or the grade of the meat, or whatever other design or indicia may be desired. It may be noted that the marking wheel moves horizontally across the carcass and rotates about its substantially vertical axis.

The structure of the improved device lends itself easily to cleaning at the end of the day's operation. The stamps and their holders may be easily disassembled merely by screwing the holders out of the marking wheel so that all these parts may be cleaned at one time. Also, the holders and stamps may be easily replaced to carry other indicia.

This structure also accommodates the tendency of the carcasses to move from side to side and forward and backward and provides a wide latitude of adjustment while still urging the marking wheel toward the carcass.

A special feature of the structure is the provision of the annular serrations about the marking wheel which keeps the wheel from slipping at its point of contact with the carcass.

While in the improved system as illustrated carcass halves are shown being marked, this system is applicable as well as to other cuts of meat such, for example, as whole hams, briskets, etc., and all such meat portions are embraced by the term "animal carcasses".

While we have described and illustrated one embodiment of the invention it will be apparent to those skilled in this art that the invention may be constructed and utilized in many other embodiments and many changes may be made all within the spirit of the invention and the scope of the appended claims.

I claim:

1. In a system for marking animal carcasses including a conveyor rail, trolley means for supporting said carcasses on said rail, and for moving said carcasses along said rail in a consecutive manner while the carcasses depend from said trolley means, including a stationary bracket, an arm pivotly connected to said bracket and moveable about its pivot to bring its extended end toward and away from carcasses passing along said rail, and spring means for urging said extended end of said arm toward said carcasses, the improvement comprising a marking wheel rotatably mounted on said extended end of said arm and adapted to resiliently contact said carcasses passing on said rail as said extended end of said arm is moved toward said carcasses, said marking wheel having a cylindrical wall and spaced taped holes in said wall, and a holder containing a stamp therein having a threaded member turned into each of said holes, whereby when said wheel is moved into contact with a carcass passing along said rail said stamp prints on said carcass.

2. A system as set forth in claim 1 including an inking roller mounted on said arm and in a position to contact said stamps as said marking wheel is rotated.

3. A system as set forth in claim 1 in which there is provided on said marking wheel at one side of said holders, and an angular serrated edge for rotating said wheel when it is brought into contact with carcasses passing on said rail.

4. A system as set forth in claim 1 in which said stamps are disc-like in shape and in which said holders engage said stamps and have threaded members depending centrally perpendicularly from said holders.

* * * * *